United States Patent
Oota

(10) Patent No.: US 10,794,481 B2
(45) Date of Patent: Oct. 6, 2020

(54) CONTROL DEVICE FOR CONTINUOUSLY VARIABLE TRANSMISSION AND CONTROL METHOD FOR CONTINUOUSLY VARIABLE TRANSMISSION

(71) Applicant: JATCO Ltd, Fuji-shi, Shizuoka (JP)

(72) Inventor: Iori Oota, Sagamihara (JP)

(73) Assignee: JATCO LTD, Fuji-Shi (JP)

(*) Notice: Subject to any disclaimer, the term of this patent is extended or adjusted under 35 U.S.C. 154(b) by 0 days.

(21) Appl. No.: 16/473,371

(22) PCT Filed: Dec. 26, 2017

(86) PCT No.: PCT/JP2017/046544
§ 371 (c)(1),
(2) Date: Jun. 25, 2019

(87) PCT Pub. No.: WO2018/124022
PCT Pub. Date: Jul. 5, 2018

(65) Prior Publication Data
US 2020/0141488 A1    May 7, 2020

(30) Foreign Application Priority Data
Dec. 26, 2016  (JP) ................. 2016-251524

(51) Int. Cl.
  *F16H 61/662*   (2006.01)
  *F16H 61/00*    (2006.01)
  *F16H 61/66*    (2006.01)

(52) U.S. Cl.
  CPC .......... *F16H 61/66236* (2013.01); *F16H 2061/0075* (2013.01); *F16H 2061/6615* (2013.01)

(58) Field of Classification Search
  CPC .. F16H 59/44; F16H 59/48; F16H 2061/0075; F16H 2061/0078;
  (Continued)

(56) References Cited

U.S. PATENT DOCUMENTS

2005/0215393 A1* 9/2005 Shimoda ........... F16H 61/66259
                                                        477/44
2013/0289841 A1* 10/2013 Okudaira ................ F16H 9/125
                                                        701/61
(Continued)

FOREIGN PATENT DOCUMENTS

JP    2002-048227 A    2/2002
JP    2007-132420 A    5/2007

*Primary Examiner* — Edwin A Young
(74) *Attorney, Agent, or Firm* — Foley & Lardner LLP

(57) ABSTRACT

A continuously variable transmission is mounted in a vehicle, and includes a primary pulley, a secondary pulley, and a belt, wherein the belt is wound around the primary pulley and the secondary pulley. A control device performs a low speed position return control by a feedback control employing a control input integral component. The low speed position return control is to control a transmission ratio to a final target transmission ratio for lower speed position while the vehicle is decelerating. The control device performs a limiting control in response to a condition that the transmission ratio has reached the final target transmission ratio during the low speed position return control. The limiting control is to limit the control input integral component based on thrust balance between the primary pulley and the secondary pulley so as to maintain the transmission ratio at the final target transmission ratio.

5 Claims, 3 Drawing Sheets

(58) Field of Classification Search
CPC ..... F16H 2061/0087; F16H 2061/6605; F16H 2061/66204; F16H 61/02; F16H 61/0202; F16H 61/0213; F16H 61/04; F16H 61/662; F16H 61/66231; F16H 61/66236

See application file for complete search history.

(56) References Cited

U.S. PATENT DOCUMENTS

2014/0343810 A1* 11/2014 Suzuki ............... F16H 61/0265
 701/60
2018/0080550 A1* 3/2018 Iwasa .................. F16H 61/662

\* cited by examiner

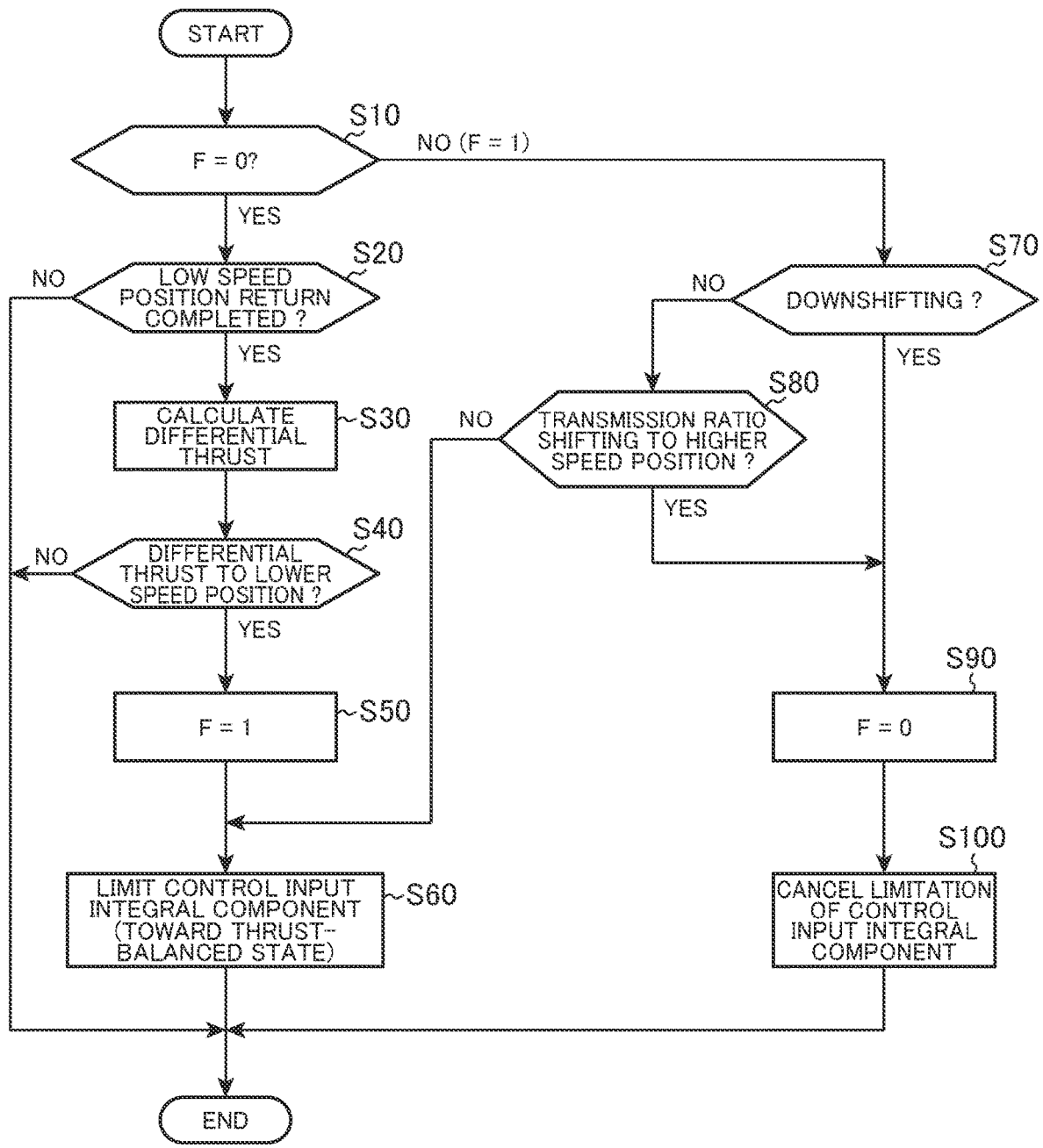

CONTROL DEVICE FOR CONTINUOUSLY VARIABLE TRANSMISSION AND CONTROL METHOD FOR CONTINUOUSLY VARIABLE TRANSMISSION

TECHNICAL FIELD

The present invention relates to a continuously variable transmission control device and a continuously variable transmission control method.

BACKGROUND ART

A continuously variable transmission is known which is mounted in a vehicle and includes a primary pulley, a secondary pulley, and a belt, wherein the belt is wound around the primary pulley and the secondary pulley. The continuously variable transmission is configured to: set a target rotational speed of the primary pulley (target primary rotational speed) based on a sensed vehicle speed and a sensed accelerator opening (or output request) by using a shift map or the like; and perform a feedback control of thrusts of the pulleys so as to conform the rotational speed of the primary pulley to the target primary rotational speed. The target primary rotational speed corresponds to a target transmission ratio.

When the vehicle decelerates at low vehicle speed, a low speed position return control is performed to control the transmission ratio to a lower speed position side (where the transmission ratio has a larger value), in order to prepare for a following restart of the vehicle from a standstill. During this operation, the target transmission ratio is set toward a lower speed position (the lowest speed position, for example), and the feedback control of the pulley thrusts is performed to conform the actual transmission ratio to the target transmission ratio.

When the feedback control of the pulley trusts during the low speed position return control is based on hydraulic pressure, there may be a problem about adjustment of the pulley thrusts, which may be caused by a failure to supply working oil quickly because of shortage of working oil.

For example, a patent document 1 discloses an art for suppressing a controlled parameter from overshooting due to accumulation of a control input integral component accompanying the feedback control, wherein a quantity equivalent to the control input integral component is set to zero when a control deviation gets equal to zero.

However, the art in which the control input integral component of the feedback control is reset to zero in response to arrival of the actual transmission ratio to the target transmission ratio, may serve to prevent the transmission ratio from overshooting, but may cause the cancellation of the control input integral component to cause an imbalance in thrust between the primary pulley and the secondary pulley, and thereby cause a change in the transmission ratio. The imbalance in thrust may cause the transmission ratio to behave undesirably, when the vehicle starts to accelerate again before getting stationary.

PRIOR ART DOCUMENT(S)

Patent Document(s)

Patent Document 1: JP 2002-48227 A

SUMMARY OF THE INVENTION

The present invention has been made in consideration of the problem described above, and is targeted for providing a continuously variable transmission control device and a continuously variable transmission control method capable of preventing a transmission ratio from overshooting toward a lower speed position side due to excessive accumulation of a control input integral component, and maintaining a thrust balance suitably, when a vehicle restarts to accelerate again during a low speed position return control based on feedback control.

Means to Solve the Problem(s)

<1> For achieving the object described above, a continuously variable transmission control device for a continuously variable transmission mounted in a vehicle, wherein the continuously variable transmission includes a primary pulley, a secondary pulley, and a belt, wherein the belt is wound around the primary pulley and the secondary pulley, the continuously variable transmission control device comprises: a controller configured to: perform a low speed position return control by a feedback control employing a control input integral component, wherein the low speed position return control is a shift control to control a transmission ratio of the continuously variable transmission to a final target transmission ratio for lower speed position while the vehicle is decelerating; and perform a limiting control in response to a condition that the transmission ratio has reached the final target transmission ratio during the low speed position return control, wherein the limiting control is a control to limit the control input integral component based on thrust balance between the primary pulley and the secondary pulley so as to maintain the transmission ratio at the final target transmission ratio.

<2> Preferably, the controller is configured to: implement the limiting control by setting a limiting-control limit for limiting the control input integral component; set the limiting-control limit at start of the limiting control such that the limiting-control limit decreases in a stepwise manner; set the limiting-control limit after start of the limiting control, for approach to a thrust-balanced state in which a thrust of the primary pulley and a thrust of the secondary are in balance; and set the limiting-control limit in response to arrival at the thrust-balanced state such that the thrust-balanced state is maintained.

<3> Preferably, the controller is configured to cancel limitation of the control input integral component in response to a cancellation request for cancellation of limitation of the control input integral component while the limiting control is being performed.

<4> Preferably, the controller is configured to identify presence of the cancellation request in response to a request for downshifting of the continuously variable transmission.

<5> Preferably, the controller is configured to identify presence of the cancellation request in response to a shift of an actual value of the transmission ratio of the continuously variable transmission to a higher speed position.

According to the present invention, it is possible to prevent the transmission ratio from overshooting toward the lower speed position side due to excessive accumulation of the control input integral component, and prevent the transmission ratio from changing due to an imbalance in thrust by limitation of the control input integral component based on thrust balance.

BRIEF DESCRIPTION OF THE DRAWINGS

FIG. 3 is a flow chart showing the control performed by the continuously variable transmission control device according to the embodiment of the present invention.

MODE(S) FOR CARRYING OUT THE INVENTION

The following describes an embodiment of the present invention with reference to the drawings. The embodiment described below is a mere example, and there is no intention to exclude various modifications and application of various techniques which are not explicitly shown in the embodiment. Each configuration of the embodiment may be modified variously without going out of the substance of the present invention. Addition or omission of each configuration, and combination of the configurations may be made as required.

Figure 1:
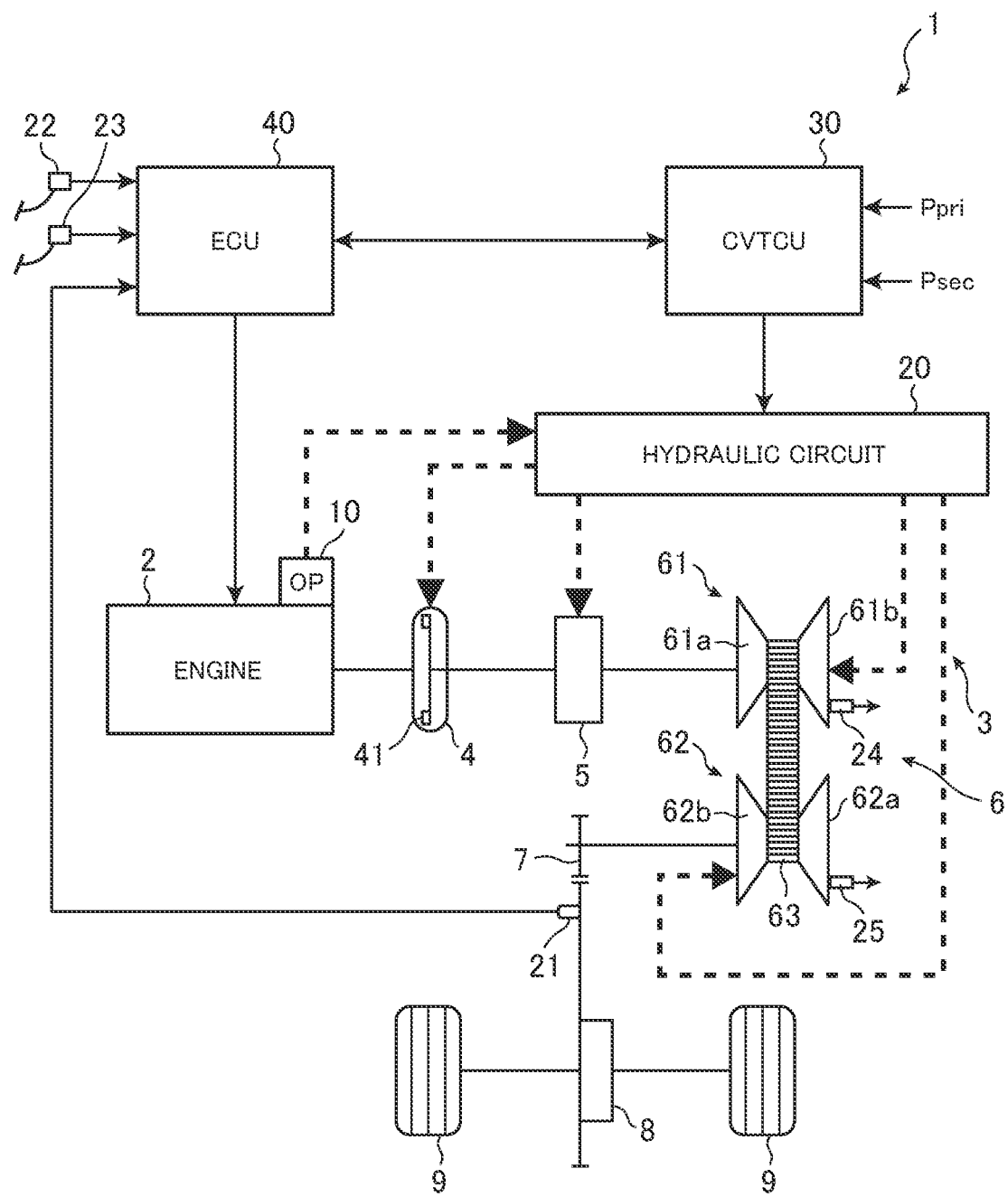
FIG. 1 is a schematic diagram showing a drive system of a vehicle to which a continuously variable transmission and its control device according to an embodiment of the present invention are applied.

<Vehicle Drive System Configuration> FIG. 1 schematically shows a drive system of a vehicle to which a continuously variable transmission and its control device according to an embodiment of the present invention are applied. As shown in FIG. 1, the drive system of vehicle 1 includes, from an upstream end of a power transmission line, an engine 2 as a drive source, a torque converter 4 provided with a lockup clutch 41, a forward and reverse shifting mechanism 5, a variator (continuously variable transmission mechanism) 6, a speed reduction gearset 7, a differential gear unit 8, and driving wheels 9. Torque converter 4, forward and reverse shifting mechanism 5, and variator 6 form a continuously variable transmission (CVT) 3.

CVT 3 is provided with an oil pump 10 and a hydraulic circuit 20 for supply of working oil to a hydraulic chamber of each of lockup clutch 41, forward and reverse shifting mechanism 5, and variator 6. Serving as a controller, a CVTCU (CVT control unit) 30 is provided to control these components 41, 5, and 6 of CVT 3 via hydraulic circuit 20. Furthermore, an ECU (engine control unit) 40 is provided to control the engine 2.

Each of CVTCU 30 and ECU 40 is composed of a CPU, a RAM, a ROM, input and output interfaces, etc. CVTCU 30 and ECU 40 transmit information to each other. Oil pump 10 is driven by a part of output power of engine 2.

Engine 2 is an internal combustion engine in which gasoline or light oil is supplied as fuel. Rotational speed, torque, etc. of engine 2 are controlled based on commands from ECU 40. The rotational speed of engine 2 is shifted by variator 6 and then transmitted to left and right driving wheels 9 via speed reduction gearset 7 and differential gear unit 8.

When lockup clutch 41 is disengaged, torque converter 4 boosts a torque, which is inputted from engine 2, by its torque boosting function, and then outputs the boosted torque. When lockup clutch 41 is engaged, torque converter 4 transmits rotation of engine 2 with no loss. The state of engagement/disengagement of lockup clutch 41 is controlled by regulating a hydraulic pressure $P_{LU}$ that is supplied from hydraulic circuit 20.

Forward and reverse shifting mechanism 5 includes a forward clutch and a reverse clutch, wherein the forward clutch is engaged for forward drive, and the reverse clutch is engaged for reverse drive. Each clutch is a multiplate hydraulic clutch whose torque capacity (or transmission capacity, which is a maximum transmissible torque) is controlled by regulating a hydraulic pressure $P_{CL}$ that is supplied from hydraulic circuit 20. When the reverse clutch is engaged, rotation of engine 2 is reversed and the reversed rotation is inputted into variator 6.

Variator 6 is a belt-type continuously variable transmission mechanism including a primary pulley 61, a secondary pulley 62, and a belt 63, wherein belt 63 is wound around pulleys 61, 62. Each pulley 61, 62 includes a stationary sheave 61a, 62a and a movable sheave 61b, 62b. Each movable sheave 61b, 62b includes a hydraulic chamber not shown (primary hydraulic chamber, secondary hydraulic chamber) to which hydraulic pressure is supplied from hydraulic circuit 20, and is structured to clamp the belt 63 by a thrust based on the supplied hydraulic pressure. A differential thrust, which is a difference in trust between movable sheave 61b and movable sheave 62b, causes a change in groove width of each pulley 61, 62, and thereby varies a transmission ratio (=[input rotational speed]/[output rotational speed]) continuously.

Hydraulic circuit 20 produces and regulates hydraulic pressures from an original pressure that is a hydraulic pressure generated by oil pump 10, and supplies the regulated hydraulic pressures to lockup clutch 41, the forward clutch, variator 6, etc. This varies the state of lockup clutch 41, the state of forward and reverse shifting mechanism 5, and the transmission ratio of variator 6.

For shifting of variator 6, CVTCU 30 is configured to: set a target transmission ratio Rt based on drive information of the vehicle, wherein the drive information includes a vehicle speed Vsp sensed by a vehicle speed sensor 21, and an accelerator opening APO sensed by an accelerator opening sensor 22; and perform a feedback control of the transmission ratio by PID control or PI control so as to conform an actual transmission ratio Rr to target transmission ratio Rt.

In case of PID control, CVTCU 30 calculates a control input Ro based on a deviation ΔR between target transmission ratio Rt and actual transmission ratio Rr.

$$\Delta R = Rt - Rr \quad (1)$$

$$Ro = K1 \cdot \Delta R + \int K2 \cdot \Delta R + K3 \cdot d\Delta R/dt \quad (2)$$

where:
K1: a proportional gain,
K2: an integral gain, and
K3: a differential gain.

According to the present embodiment, variator 6 is structured to: adjust a thrust for clamping the belt 63 by a secondary pressure Psec applied to the hydraulic chamber of secondary pulley 62; adjust a thrust balance between a primary pressure Ppri and the secondary pressure by the primary pressure applied to the hydraulic chamber of primary pulley 61; and thereby vary the transmission ratio for shifting.

<Low Speed Position Return Control> CVTCU 30 performs a low speed position return control to shift the variator 6 toward a lower speed position, so as to allow favorable restart of the vehicle, immediately before the vehicle gets stationary. The low speed position return control is performed based on information from accelerator opening sensor 22 and a brake sensor 23, in response to a condition that vehicle speed Vsp becomes lower than or equal to a predetermined vehicle speed during braking with an accelerator off and a brake on. The low speed position return control is implemented by: setting a final target transmission ratio Rtt for a lower speed position (the lowest speed position, for example); setting target transmission ratio Rt for each control cycle toward final target transmission ratio Rtt; and performing a feedback control of actual transmission ratio Rr by PID control or PI control. The low speed position return control is canceled by one of brake-on operation and accelerator-on operation.

Setting of target transmission ratio Rt for each control cycle is implemented by setting the target transmission ratio Rt such that target transmission ratio Rt increases for quicker arrival to final target transmission ratio Rtt as reduction of vehicle speed Vsp (deceleration) increases. Accordingly, when a brake pedal is further depressed, target transmission ratio Rt is then set to significantly change toward the lower speed position side, so that the deviation between actual transmission ratio Rr and target transmission ratio Rt tends to become larger. Accumulation of this deviation causes the control input integral component CVint ($=\int K2 \cdot \Delta R$) to be larger, and may cause the actual transmission ratio Rr to overshoot the target transmission ratio Rt (=final target transmission ratio Rtt) to the lower speed position side after arrival thereto.

Figure 2A:
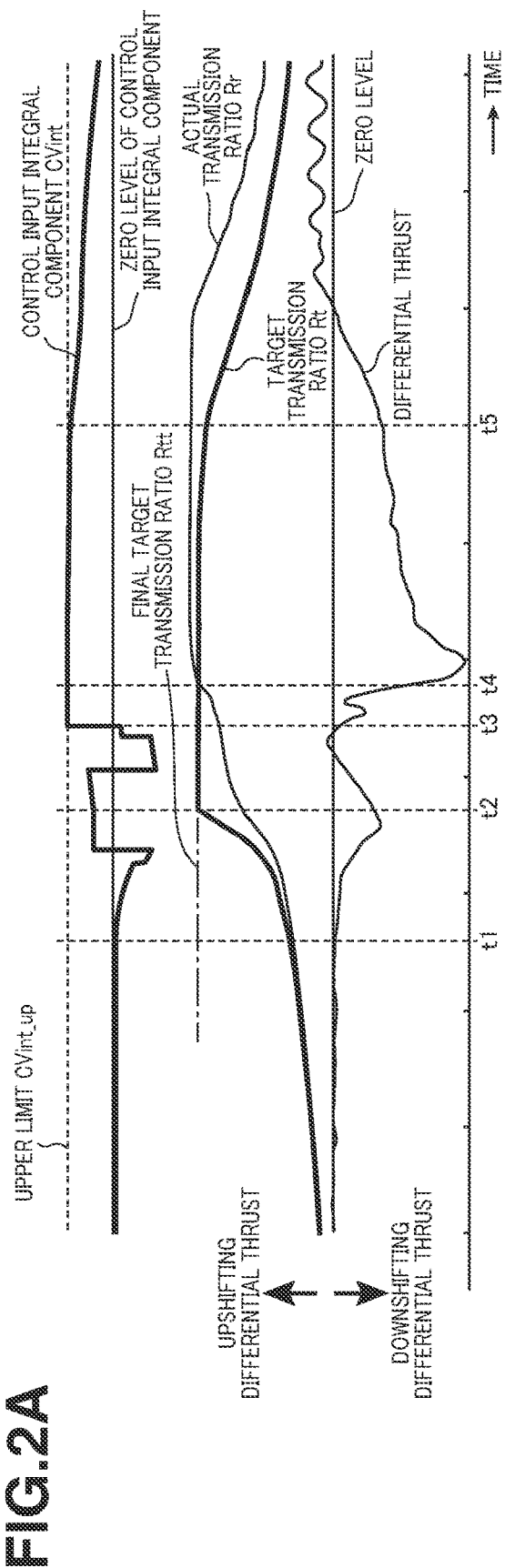
FIGS. 2A and 2B are time charts illustrating a control performed by the continuously variable transmission control device according to the embodiment of the present invention, and effects produced by the control, where FIG. 2A relates to a case in which the present control is not employed, and FIG. 2B relates to a case in which the present control is employed.

FIG. 2A is a time chart illustrating that problem. As shown in FIG. 2A, at a time instant t1 when the brake pedal is further depressed during the low speed position return control, target transmission ratio Rt is made to approach the final target transmission ratio Rtt quickly. This causes a large deviation between actual transmission ratio Rr and target transmission ratio Rt. At a time instant t2, target transmission ratio Rt reaches the final target transmission ratio Rtt. Thereafter, at a time instant t3, control input integral component CVint reaches an upper limit CVint_up that is set for control input integral component CVint. Thereafter, at a time instant t4, actual transmission ratio Rr finally reaches the final target transmission ratio Rtt. During this behavior, control input integral component CVint has been increased due to accumulation, so that after time instant t4, at which actual transmission ratio Rr reaches target transmission ratio Rt (=final target transmission ratio Rtt), control input integral component CVint overshoots the final target transmission ratio Rtt to the lower speed position side.

Thereafter, before the vehicle gets stationary, at a time instant t5 when the accelerator is depressed to cancel the low speed position return control and start a normal shift control, target transmission ratio Rt changes to the higher speed position side. On the other hand, after the accumulation of control input integral component CVint is eliminated, actual transmission ratio Rr starts to change to the higher speed position side with a long delay after the change of target transmission ratio Rt. This prevents the transmission ratio from changing as desired, and causes the shift feel to be adversely affected.

In order to avoid that problem, after actual transmission ratio Rr reaches the final target transmission ratio Rtt during the low speed position return control, CVTCU 30 maintains a thrust-balanced state, based on thrust balance between primary pulley 61 and secondary pulley 62, and performs a limiting control to limit the control input integral component CVint so as to maintain actual transmission ratio Rr at final target transmission ratio Rtt.

During the limiting control, a limiting-control limit CVint_lin is set to limit the magnitude of control input integral component CVint. Specifically, according to the present embodiment, at start of the limiting control, limiting-control limit CVint_lin is set to cause control input integral component CVint to decrease in a stepwise manner; and limiting-control limit CVint_lin is thereafter set to allow the differential thrust between the thrust of secondary pulley 62 and the thrust of primary pulley 61 to approach the thrust-balanced state; and in response to arrival to the thrust-balanced state, limiting-control limit CVint_lin is set to maintain this thrust-balanced state.

At start of the limiting control, limiting-control limit CVint_lin is set to half a value with which the differential thrust between the thrust of secondary pulley 62 and the thrust of primary pulley 61 is in the thrust-balanced state. Thereafter, limiting-control limit CVint_lin is reduced gradually so as to allow the differential thrust to approach the thrust-balanced state. This serves to suppress the transmission ratio from fluctuating due to rapid fluctuation of control input integral component CVint.

The thrust of each of primary pulley 61 and secondary pulley 62 corresponds to the internal pressure of its hydraulic chamber (primary pressure or secondary pressure). Accordingly, the differential thrust is determined based on sensing information about the primary pressure and secondary pressure acquired by a primary pressure sensor 24 and a secondary pressure sensor 25. If no primary pressure sensor and no secondary pressure sensor are provided, control command values are used to calculate an estimate value of the differential thrust.

Figure 2B:
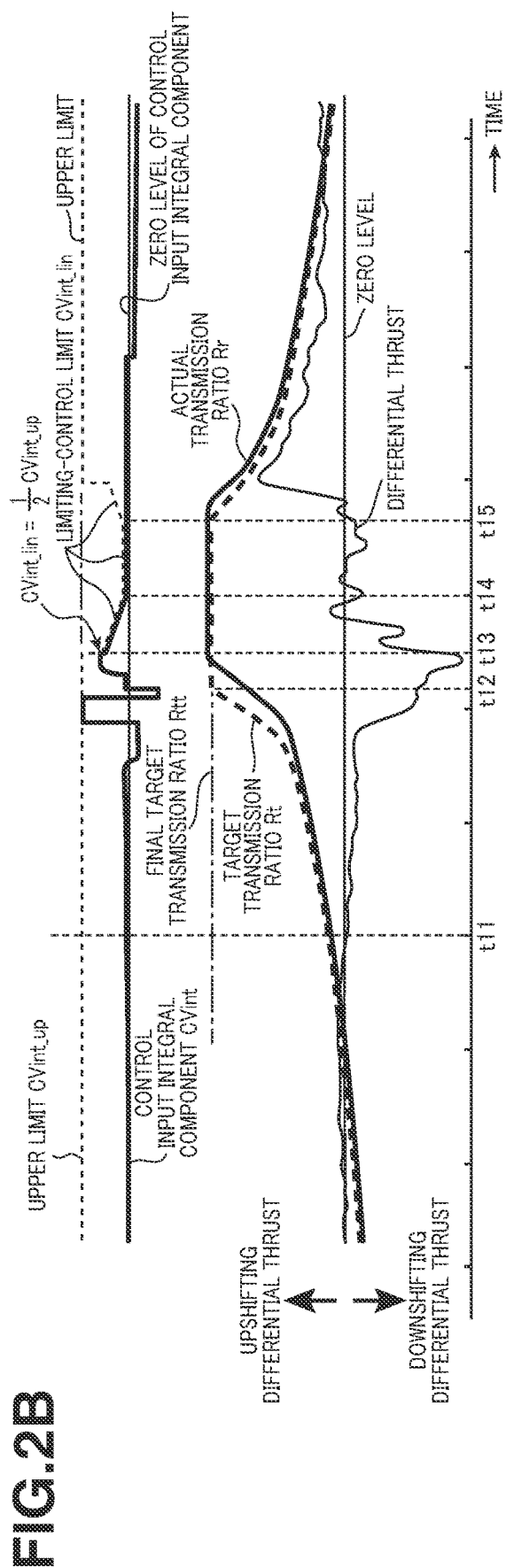

In an example shown in FIG. 2B, at a time instant t11 when the brake pedal is further depressed during the low speed position return control, target transmission ratio Rt is made to quickly approach final target transmission ratio Rtt. This causes a deviation between actual transmission ratio Rr and target transmission ratio Rt. At a time instant t12, target transmission ratio Rt reaches final target transmission ratio Rtt. Thereafter, at a time instant t13, actual transmission ratio Rr reaches target transmission ratio Rt (=final target transmission ratio Rtt). During this behavior, control input integral component CVint becomes large due to accumulation, but the limiting control of control input integral component CVint is performed after time instant t13 when actual transmission ratio Rr reaches target transmission ratio Rt.

Specifically, at time instant t13, the imitation of control input integral component CVint is enhanced to limiting-control limit CVint_lin that is set to half the limitation for the thrust-balanced state, to suppress accumulation of control input integral component CVint and reduce the downshifting differential thrust that is caused by downshifting operation. Thereafter, limiting-control limit CVint_lin is reduced gradually (the limitation is enhanced gradually) so as to reduce the downshifting differential thrust toward the thrust-balanced state. At a time instant t14 when the differential thrust reaches the thrust-balanced state, limiting-control limit CVint_lin is set to maintain the thrust-balanced state. The value of limiting-control limit CVint_lin to maintain the thrust-balanced state is close to a region where control input integral component CVint is small, but is not necessarily equal to a zero level of control input integral component CVint.

Namely, the limitation of control input integral component CVint by the present control device is intended to maintain the thrust-balanced state, where limiting-control limit CVint_lin is set based on the differential thrust. In contrast, if control input integral component CVint is reset to zero simply, it may be possible that the differential thrust cannot be controlled to the thrust-balanced state so that the transmission ratio may fall unstable.

Referring back to FIG. 2B, thereafter, before the vehicle gets stationary, at a time instant t15 when the accelerator is depressed to cancel the low speed position return control and start the normal shift control and target transmission ratio Rt changes to the higher speed position side, actual transmission ratio Rr responsively follows the change of target transmission ratio Rt to start shifting toward the higher speed position side, because of small accumulation of control input integral component CVint. This serves to allow the transmission ratio to change as desired, and thereby enhance the shift feel.

CVTCU 30 is further configured to cancel the limitation of control input integral component CVint, in response to a request for cancellation of the limitation of the control input integral component, while the limiting control is being performed.

The request for cancellation is generated by occurrence of a request for downshifting of CVT 3 or a shifting of actual transmission ratio Rr of CVT 3 to the higher speed position side. In response to the request for cancellation, the limiting control is cancelled. More specifically, CVTCU 30 determines presence of the request for cancellation in response to a request for downshifting of CVT 3, and determines presence of the request for cancellation in response to a shifting of actual transmission ratio Rr of CVT 3 to the higher speed position side, and determines presence of the request for cancellation in response to presence of a request for re-acceleration of the vehicle, and cancel the limiting control in response to the request for cancellation.

<Actions and Effects> The thus-configured continuously variable transmission control device according to the present embodiment performs the limiting control of control input integral component CVint during the low speed position return control as shown in a flow chart of FIG. 3. This flow is executed at intervals of a predetermined control period during the low speed position return control. In the flow chart of FIG. 3, "F" represents a flag regarding the limiting control of control input integral component CVint, wherein F is set to one while the limiting control is active, and is set to zero while the limiting control is inactive.

First, it determines whether or not flag F is equal to zero (Step S10). When flag F is equal to zero, namely, when the limiting control of control input integral component CVint is not being performed, it then determines whether or not the low speed position return control is completed (Step S20). The low speed position return control, which is a feedback control of the actual transmission ratio toward the final target transmission ratio for lower speed position, is determined as being completed, in response to arrival of the actual transmission ratio to the final target transmission ratio. When the low speed position return control is not determined as being completed (in case of NO at Step S20), it then terminates the process of the present control cycle.

When the low speed position return control is determined as being completed (in case of YES at Step S20), it then calculates the differential thrust between the thrust of secondary pulley 62 and the thrust of primary pulley 61 (Step S30). Then, it determines whether or not the differential thrust is one to the lower speed position side (Step S40). When the differential thrust is one to the lower speed position side (in case of YES at Step S40), it then sets flag F to one (Step S50), and performs the limiting control to limit control input integral component CVint based on thrust balance (Step S60). When the low speed position return control is not completed, or the differential thrust is not one to the lower speed position side (in case of NO at Step S40), it then terminates the process of the present control cycle.

On the other hand, when flag F is equal to one, namely, when the limiting control of control input integral component CVint is being performed, it then determines whether or not a request for downshifting is present (Step S70), based on NO-determination at Step S10. Although the request for downshifting is never present if the final target transmission ratio corresponds to the lowest speed position, the request for downshifting is possible because the final target transmission ratio during the low speed position return control is not limited to the lowest speed position.

When the request for downshifting is not present, namely, when the target transmission ratio is not set to the lower speed position side of the actual transmission ratio, it then determines whether or not the transmission ratio has shifted to the higher speed position side (Step S80). For example, as the accelerator pedal is depressed to change the target transmission ratio to the higher speed position side, the actual transmission ratio changes to the higher speed position side, following the target transmission ratio. Furthermore, also when the limiting control is active and causes a differential thrust toward the higher speed position side, the actual transmission ratio changes to the higher speed position side.

When the request for downshifting is present, namely, when the target transmission ratio is set to the lower speed position side of the actual transmission ratio, it then resets flag F to zero (Step S90), and cancels the limiting control of control input integral component CVint (Step S100). When the request for downshifting is not present and the transmission ratio does not shift to the higher speed position side, the limiting control of control input integral component CVint is continued (Step S60).

When the limiting control is performed, limiting-control limit CVint_lin is employed to limit the magnitude of control input integral component CVint. At start of the limiting control, limiting-control limit CVint_lin is set to half the value for obtaining the thrust-balanced state so as to reduce control input integral component CVint in a stepwise manner, and thereafter, limiting-control limit CVint_lin is set to cause the differential thrust between the thrust of secondary pulley 62 and the thrust of primary pulley 61 to approach the thrust-balanced state, and when the thrust-balanced state is obtained, limiting-control limit CVint_lin is set to maintain the obtained thrust-balanced state.

The thus-configured limiting control serves to suppress accumulation of control input integral component CVint, and control the differential thrust to the thrust-balanced state, and thereby maintain the transmission ratio at the final target transmission ratio stably, and achieve the stable low speed position return control. This serves to achieve a suitable transmission ratio control quickly in response to a request for re-acceleration or the like. This serves to allow the transmission ratio to be changed as desired, and enhance the shift feel.

The present invention is not limited to the embodiment described above, but may be carried out with modifications as required. For example, although the present embodiment is configured such that limiting-control limit CVint_lin is set to reduce control input integral component CVint in the stepwise manner at start of the limiting control and thereafter set to cause the differential thrust to approach the thrust-balanced state, thereby allowing a quick approach to the thrust-balanced state, the invention is not so limited but it may be modified such that at and after start of the limiting control, limiting-control limit CVint_lin is set to cause the differential thrust to approach the thrust-balanced state.

Although the present embodiment is configured such that limiting-control limit CVint_lin is set to a reduced value that is half the value for obtaining the thrust-balanced state so as to reduce control input integral component CVint in a stepwise manner at start of the limiting control, the ratio of the reduced value of limiting-control limit CVint_lin with respect to the value for obtaining the thrust-balanced state is not so limited.

The invention claimed is:

1. A continuously variable transmission control device for a continuously variable transmission mounted in a vehicle, wherein the continuously variable transmission includes a primary pulley, a secondary pulley, and a belt, wherein the belt is wound around the primary pulley and the secondary pulley, the continuously variable transmission control device comprising:
   a controller configured to:
      perform a low speed position return control by a feedback control employing a control input integral component, wherein the low speed position return control is a shift control to control a transmission ratio of the continuously variable transmission to a final target transmission ratio for lower speed position while the vehicle is decelerating; and
      perform a limiting control in response to a condition that the transmission ratio has reached the final target transmission ratio during the low speed position return control, wherein the limiting control is a control to limit the control input integral component based on thrust balance between the primary pulley and the secondary pulley so as to maintain the transmission ratio at the final target transmission ratio;
   wherein the controller is configured to:
      implement the limiting control by setting a limiting-control limit for limiting the control input integral component;
      set the limiting-control limit at start of the limiting control such that the limiting-control limit decreases in a stepwise manner;
      set the limiting-control limit after start of the limiting control, for approach to a thrust-balanced state in which a thrust of the primary pulley and a thrust of the secondary pulley are in balance; and
      set the limiting-control limit in response to arrival at the thrust-balanced state such that the thrust-balanced state is maintained.

2. The continuously variable transmission control device as claimed in claim 1, wherein the controller is configured to cancel limitation of the control input integral component in response to a cancellation request for cancellation of limitation of the control input integral component while the limiting control is being performed.

3. The continuously variable transmission control device as claimed in claim 2, wherein the controller is configured to identify presence of the cancellation request in response to a request for downshifting of the continuously variable transmission.

4. The continuously variable transmission control device as claimed in claim 2, wherein the controller is configured to identify presence of the cancellation request in response to a shift of an actual value of the transmission ratio of the continuously variable transmission to a higher speed position.

5. A continuously variable transmission control method for a continuously variable transmission mounted in a vehicle, wherein the continuously variable transmission includes a primary pulley, a secondary pulley, and a belt, wherein the belt is wound around the primary pulley and the secondary pulley, the continuously variable transmission control method comprising:
   performing a low speed position return control by a feedback control employing a control input integral component, wherein the low speed position return control is a shift control to control a transmission ratio of the continuously variable transmission to a final target transmission ratio for lower speed position while the vehicle is decelerating; and
   performing a limiting control in response to a condition that the transmission ratio has reached the final target transmission ratio during the low speed position return control, wherein the limiting control is a control to limit the control input integral component based on thrust balance between the primary pulley and the secondary pulley so as to maintain the transmission ratio at the final target transmission ratio;
   wherein the continuously variable transmission control method further comprises:
   implementing the limiting control by setting a limiting-control limit for limiting the control input integral component;
   setting the limiting-control limit at start of the limiting control such that the limiting-control limit decreases in a stepwise manner;
   setting the limiting-control limit after start of the limiting control, for approach to a thrust-balanced state in which a thrust of the primary pulley and a thrust of the secondary pulley are in balance; and
   setting the limiting-control limit in response to arrival at the thrust-balanced state such that the thrust-balanced state is maintained.

* * * * *